J. HEUSSER.
HAY FORK.
APPLICATION FILED DEC. 7, 1914.
1,165,504.
Patented Dec. 28, 1915.
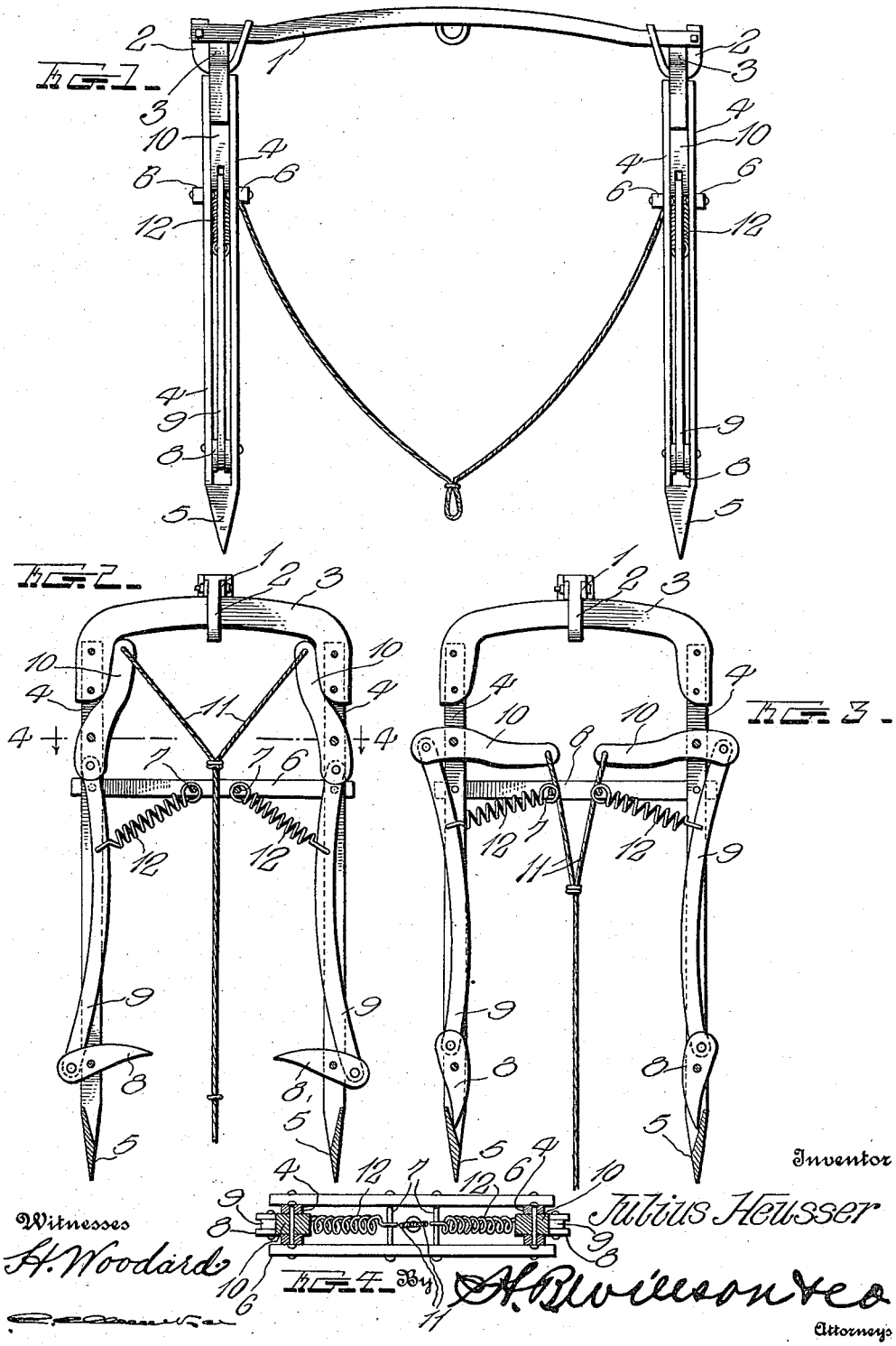

UNITED STATES PATENT OFFICE.

JULIUS HEUSSER, OF MONROE, WISCONSIN.

HAY-FORK.

1,165,504. Specification of Letters Patent. Patented Dec. 28, 1915.

Application filed December 7, 1914. Serial No. 875,904.

*To all whom it may concern:*

Be it known that I, JULIUS HEUSSER, a citizen of the United States, residing at Monroe, in the county of Green and State of Wisconsin, have invented certain new and useful Improvements in Hay-Forks; and I do declare the following to be a full, clear, and exact description of the invention, such as will enable others skilled in the art to which it appertains to make and use the same.

My invention relates to improvements in hay forks and has for its object to prevent the hay gripping jaws of devices of this character from being released when the fork is in operation, and to likewise prevent said jaws from being projected when the fork is being forced into the hay.

In carrying out the above object, I employ certain novel features of construction and combination herein described and claimed and shown in the drawings wherein:

Figure 1 is a side elevation of a hay fork constructed in accordance with the invention; Fig. 2 is an end view thereof with parts removed and in section, the jaws being shown in projected position; Fig. 3 is a similar view illustrating the jaws in retracted position; and Fig. 4 is a horizontal section as seen on the line 4—4 of Fig. 2.

In these drawings, forming a part of the present application, the numeral 1 designates a slightly arched suspending bar which is connected by suitably constructed hooks 2 with a pair of arched supporting bars 3, the downwardly turned ends of the latter being secured between upright bars 4 whose lower ends are integrally united and pointed as seen at 5, each pair of said bars therefore constituting one tine of the fork. Near their upper ends, the two tines, at each end of the fork, are connected by a pair of transverse bars 6 which are riveted or otherwise secured thereto as shown, these bars being also connected one to the other, by stay-bolts 7 as most clearly seen in Fig. 4.

Pivoted between the lower ends of the bars 4 or, in other words, pivoted to the lower ends of the tines, are hay gripping jaws 8 whose inner ends are pivoted and whose outer ends are pivoted to the lower ends of upright links 9. The upper edge of the united portions of the upright bars 4 are beveled inwardly toward each other to receive the pointed inner ends of the hay gripping jaws 8 when the fork is being projected through a pile of hay as shown in Fig. 3. These beveled portions not only provide a place for the reception of the ends of the jaws so that they will not catch in any hay on the downward movement of the fork, but they also act as stops, thereby preventing a too great movement of said jaws. The upper ends of the latter are pivoted to the outer ends of operating levers 10 which are pivoted between the upper ends of the bars 4, at points spaced above the bars 6, said levers being pivoted between their ends and having their inner ends connected in any suitable manner by operating cables 11, whereby a downward pull on said cables will move all of the jaws 8 from the position seen in Fig. 2 to that seen in Fig. 3.

Heretofore, the structure as so far described, has constituted a common form of hay fork in every day use. It has been found, however, that this device is not as effective as it should be, since no means are provided for preventing the jaws 8 from being retracted when a load of hay is being raised.

The improvement over the structure previously described, therefore resides in the provision of four coiled springs 12, a pair of said springs being located at each end of the fork. The outer ends of the springs 12 are connected to the links 9 at points spaced below the bars 6, while their inner or upper ends are connected to the stay-bolts 7. The tension of these springs is thereby exerted to retain the levers 10 in their upright positions, in which positions, the jaws 8 are projected, or to prevent said jaws from being projected when the tines are being forced into the hay (see Fig. 3). This double action of the springs is made possible by the fact that they pull inwardly on the links 9, when the latter stand as seen in Fig. 2, thereby preventing the weight of the load from moving said links outwardly to rock the levers 10, and by the fact that they exert an upward and inward pull on the links to retain the same and the parts coacting therewith in the position seen in Fig. 3.

From the foregoing description, taken in connection with the accompanying drawings, it will be seen that by merely attaching a number of coiled springs to the ordinary type of hay fork, the efficiency thereof is greatly increased. It will therefore be appreciated that the alteration, although simple, is highly desirous.

I claim:

A hay fork comprising an upright tine, a hay gripping jaw fulcrumed between its ends to the lower end of said tine and movable from a normally upright to a horizontal position, an operating lever fulcrumed between its ends to the upper end of the tine and movable from a normally horizontal to an upright position, and an upright link pivoted at its upper end to one end of the lever and at its other end to one end of the jaw, the fulcrum of the lever and the pivots of the link being disposed substantially on dead center when said lever is positioned vertically to dispose the jaw horizontally, and the pivotal connection of the link and jaw being disposed above the fulcrum of said jaw when the latter is positioned vertically; in combination with a bar extending laterally from the tine above the fulcrum of the operating lever and at right angles to said fulcrum, and an inclined coiled spring connected at its upper end with said bar and at its lower end to the upper end portion of the link, whereby to yieldably hold said link against movement to retain the relative positions of fulcrums and pivots specified and to thereby prevent accidental movement of the jaw.

In testimony whereof I have hereunto set my hand in presence of two subscribing witnesses.

JULIUS HEUSSER.

Witnesses:
 RITA B. KILGORE,
 FANNIE BEUKERT.

Copies of this patent may be obtained for five cents each, by addressing the "Commissioner of Patents, Washington, D. C."